US012585518B2

(12) United States Patent (10) Patent No.: US 12,585,518 B2
Chen (45) Date of Patent: *Mar. 24, 2026

(54) ELECTRONIC APPARATUS FOR LOGGING, NON-TRANSITORY COMPUTER-READABLE RECORD MEDIUM FOR LOGGING, AND LOGGING METHOD

(71) Applicant: Getac Technology Corporation, New Taipei (TW)

(72) Inventor: Xiao-Jyun Chen, Taipei (TW)

(73) Assignee: Getac Technology Corporation, New Taipei City (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/779,199

(22) Filed: Jul. 22, 2024

(65) Prior Publication Data

US 2025/0217220 A1 Jul. 3, 2025

(30) Foreign Application Priority Data

Dec. 29, 2023 (CN) .......................... 202311845298.1

(51) Int. Cl.
G06F 11/00 (2006.01)
G06F 11/07 (2006.01)
(52) U.S. Cl.
CPC ...... G06F 11/0766 (2013.01); G06F 11/0751 (2013.01)
(58) Field of Classification Search
CPC ............. G06F 11/0766; G06F 11/0751; G06F 11/0778; G06F 11/3476
See application file for complete search history.

(56) References Cited

U.S. PATENT DOCUMENTS 8,330,773 B2 * 12/2012 Nielsen ................. G06F 40/103
345/619
10,078,412 B2 * 9/2018 Chana ................... G06F 3/0484
(Continued)

FOREIGN PATENT DOCUMENTS

CN 109032929 A 12/2018
CN 111459984 B 7/2020
(Continued)

OTHER PUBLICATIONS

European search opinion for EP4579464A1 (Year: 2025).*
(Continued)

*Primary Examiner* — Elmira Mehrmanesh
(74) *Attorney, Agent, or Firm* — Cooper Legal Group, LLC

(57) ABSTRACT

The present invention provides an electronic apparatus, a non-transitory computer-readable record medium, and a logging method. The logging method is stored on the non-transitory computer-readable record medium and executed by the electronic apparatus. The logging method includes the following steps: recording a log into a log document with an enabling button; executing a situation annotation with an annotation button based on situation determining; storing the situation annotation into a time series of the log document; determining whether there is the situation annotation in the log document; and displaying a log segment corresponding to the situation annotation when a determining result is yes. This allows for quick marking on the time point of an error event during logging, thus facilitating subsequent tracking.

6 Claims, 3 Drawing Sheets

(56)     References Cited

U.S. PATENT DOCUMENTS

| | | | | |
|---|---|---|---|---|
| 10,296,444 | B1 * | 5/2019 | Choudhary | G06F 11/3696 |
| 10,649,634 | B2 * | 5/2020 | De Paula | G06F 3/048 |
| 2010/0229112 | A1 | 9/2010 | Ergan et al. | |
| 2013/0173351 | A1 * | 7/2013 | Livne | G06Q 10/06395 |
| | | | | 705/7.38 |
| 2014/0133692 | A1 * | 5/2014 | Spata | G06F 11/3476 |
| | | | | 382/100 |
| 2014/0237304 | A1 * | 8/2014 | Lai | G06F 11/0742 |
| | | | | 714/57 |
| 2022/0019588 | A1 | 1/2022 | Jha et al. | |
| 2023/0088164 | A1 * | 3/2023 | Varada | G06F 11/3698 |
| | | | | 717/123 |
| 2023/0327480 | A1 | 10/2023 | Dustman | |

FOREIGN PATENT DOCUMENTS

| | | | |
|---|---|---|---|
| CN | 112148700 | A | 12/2020 |
| CN | 113590371 | A | 11/2021 |
| CN | 113703400 | B | 3/2023 |
| CN | 116113359 | A | 5/2023 |
| TW | 201009606 | A | 3/2010 |
| TW | 202303388 | A | 1/2023 |

OTHER PUBLICATIONS

RxLogger Settings—Zebra Technologies TechDocs, https://techdocs. zebra.com/rxlogger/7-0/guide/settings/, Jul. 10, 2024, 7 pages.

* cited by examiner

1

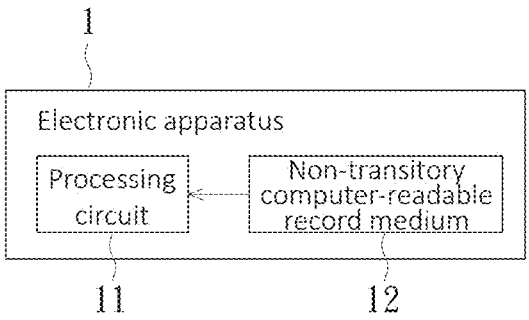

FIG. 1

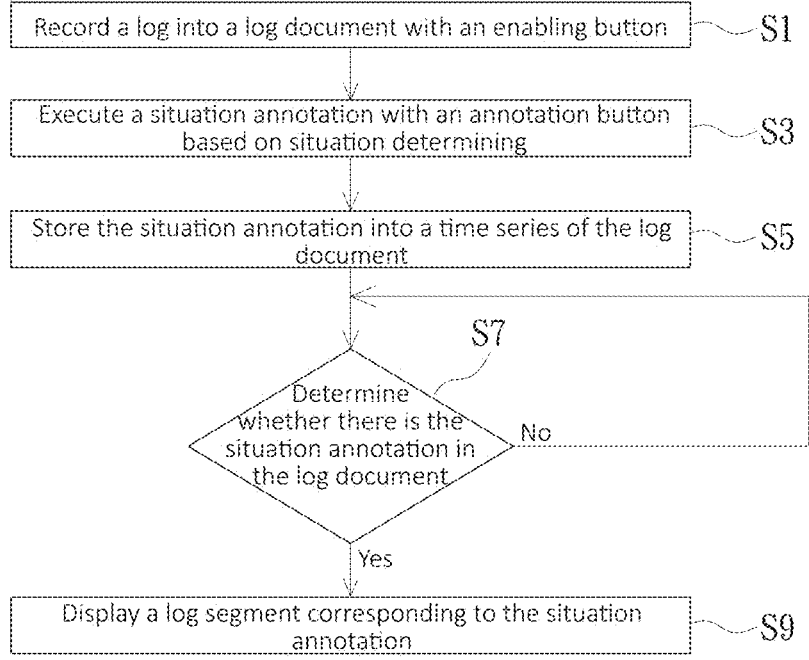

Record a log into a log document with an enabling button — S1

Execute a situation annotation with an annotation button based on situation determining — S3

Store the situation annotation into a time series of the log document — S5

S7

Determine whether there is the situation annotation in the log document

No

Yes

Display a log segment corresponding to the situation annotation — S9

ELECTRONIC APPARATUS FOR LOGGING, NON-TRANSITORY COMPUTER-READABLE RECORD MEDIUM FOR LOGGING, AND LOGGING METHOD

CROSS-REFERENCE TO RELATED PATENT APPLICATION

This application claims the benefit of priority to the China Patent Application No. 202311845298.1, filed on Dec. 29, 2023. The entire content of the China Patent Application No. 202311845298.1 is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE INVENTION

The present invention relates to an electronic apparatus, a logging method, and a non-transitory computer-readable record medium.

BACKGROUND OF THE INVENTION

The logging tool primarily provides functions of recording and reviewing logs to assist in tracking and documenting events and error situations that occur during system execution of the computer. However, when a great many logs are output, it is difficult to find specific issues. Consequently, the efficiency and accuracy of troubleshooting operations do not meet expectations. How to quickly mark the time point of an error event so as to facilitate subsequent tracking is the important task to be resolved in this technical field.

SUMMARY OF THE INVENTION

The present invention provides an electronic apparatus, a non-transitory computer-readable record medium, and a logging method, which allow for quick marking on the time point of an error event during logging, thus facilitating subsequent tracking.

The electronic apparatus provided by the present invention is configured to execute the logging method stored on the non-transitory computer-readable record medium. The executing includes the following steps: recording a log into a log document with an enabling button; executing a situation annotation with an annotation button based on situation determining; storing the situation annotation into a time series of the log document; determining whether there is the situation annotation in the log document; and displaying a log segment corresponding to the situation annotation when a determining result is yes.

The non-transitory computer-readable record medium provided by the present invention includes the logging method. After the electronic apparatus executes the logging method, the following steps are performed: recording a log into a log document with an enabling button; executing a situation annotation with an annotation button based on situation determining; storing the situation annotation into a time series of the log document; determining whether there is the situation annotation in the log document; and displaying a log segment corresponding to the situation annotation when a determining result is yes.

The logging method provided by the present invention is suitable for and executed by the electronic apparatus. The logging method includes the following steps: recording a log into a log document with an enabling button; executing a situation annotation with an annotation button based on situation determining; storing the situation annotation into a time series of the log document; determining whether there is the situation annotation in the log document; and displaying a log segment corresponding to the situation annotation when a determining result is yes.

In an embodiment of the present invention, the situation determining is error determining.

In an embodiment of the present invention, the situation determining is exception determining.

In an embodiment of the present invention, the electronic apparatus includes a touchscreen display to display the enabling button and the annotation button.

The present invention provides a user interface and a touching method for logging-related application tool and marks the time point of an error event with the annotation button, thus allowing for quick marking on the time point of the error event so as to facilitate subsequent tracking.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIG. 1 is a schematic diagram of an electronic apparatus according to an embodiment of the present invention.

FIG. 2 is a flowchart of a logging method according to an embodiment of the present invention.

DETAILED DESCRIPTION OF PREFERRED EMBODIMENTS

To make the objectives, technical solutions, and advantages of the present invention more comprehensible, the following describes the present invention in detail with reference to embodiments and accompanying drawings. It should be understood that the specific embodiments described herein are merely used to explain the present invention but are not intended to limit the present invention. All other embodiments obtained by persons skilled in the art based on the embodiments of the present invention without creative efforts shall fall within the protection scope of present invention.

FIG. 1 is a schematic diagram of an electronic apparatus according to an embodiment of the present invention. The electronic apparatus 1 provided in this embodiment includes a processing circuit 11 and a non-transitory computer-readable record medium 12 coupled to the processing circuit 11. The electronic apparatus 1 may be a computing apparatus such as a personal computer, a laptop, or a tablet, which includes a touchscreen display to display an enabling button and an annotation button. The non-transitory computer-readable record medium 12 is used to store a logging method and the processing circuit 11 is used to execute the logging method. The log is used for recording events and error situations that occur during system execution of the electronic apparatus 1.

Figure 3:
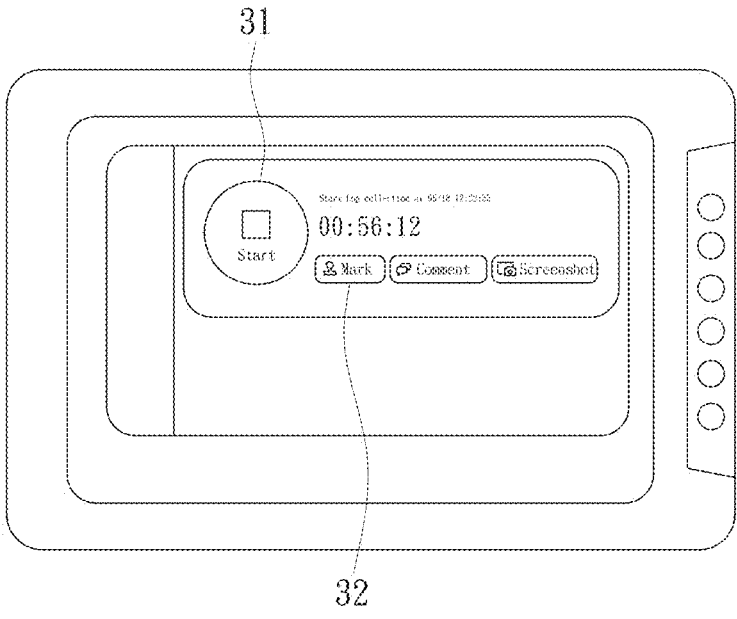
FIG. 3 is a schematic diagram of a first user interface according to an embodiment of the present invention.

FIG. 2 is a flowchart of a logging method according to an embodiment of the present invention. The logging method provided in this embodiment includes the following steps: Step S1: Record a log into a log document with an enabling button. Specifically, FIG. 3 is a schematic diagram of a first user interface according to an embodiment of the present invention. The user can tap the enabling button (start) 31 on the touchscreen display of an electronic apparatus 1 for logging.

Figure 4:
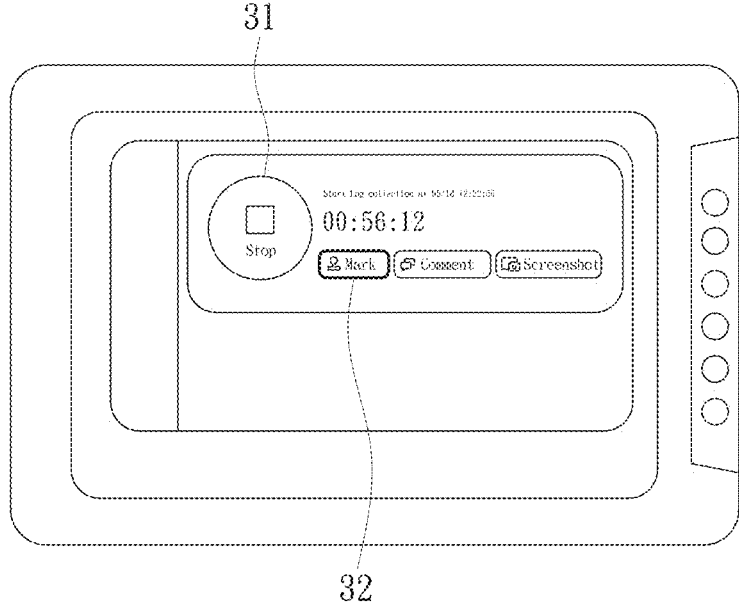
FIG. 4 is a schematic diagram of a second user interface according to an embodiment of the present invention.

Step S3: Execute a situation annotation with an annotation button based on situation determining, where the situation determining is error determining or exception determining. Specifically, FIG. 4 is a schematic diagram of a second user interface according to an embodiment of the present invention. When determining the occurrence of an exception event and an error situation during system execution, the user can tap the annotation button (annotation) 32 to generate a situation annotation about the exception event and the error situation.

Figures 5, 6:
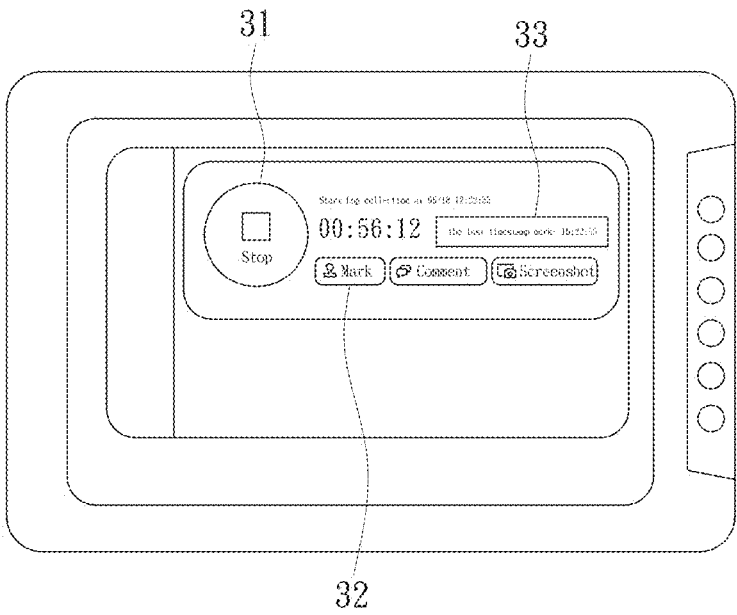
FIG. 5 is a schematic diagram of a third user interface according to an embodiment of the present invention.
FIG. 6 is a schematic diagram of a log document according to an embodiment of the present invention.

Step S5: Store the situation annotation into a time series of the log document. Specifically, FIG. 5 is a schematic diagram of a third user interface according to an embodiment of the present invention. After the user taps the annotation button (annotation) 32, the touchscreen display of the electronic apparatus 1 displays the current timestamps 33 of the exception event and error situation and the situation annotations are stored into a time series of the log document.

Step S7: Determine whether there is the situation annotation in the log document. Specifically, after the user taps the enabling button (stop) 31, the electronic apparatus 1 stops logging and determines whether there is the situation annotation in the log document.

Step S9: Display a log segment corresponding to the situation annotation. Specifically, FIG. 6 is a schematic diagram of a log document according to an embodiment of the present invention. When it is determined that there is the situation annotation in the log document, the electronic apparatus 1 displays the log segment corresponding to the situation annotation on the touchscreen display for the user to check exception event and error situation, so as to accelerate check for exception event and error situation by the user.

In summary, the present invention provides a user interface and a touching method for logging-related application tool and marks the time point of an error event with the annotation button, thus allowing for quick marking on the time point of the error event, so as to facilitate subsequent tracking and accelerate check for exception event and error situation.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A non-transitory computer-readable record medium, comprising a logging method, wherein the following steps are performed after the logging method is executed by an electronic apparatus:

recording a log into a log document by using an enabling button;

determining an occurrence of an exception event and an error situation;

executing a situation annotation by using an annotation button based on situation determining, wherein the situation annotation comprises timestamps of the exception event and the error situation, and the situation determining is an occurrence of error determining or exception determining;

storing the situation annotation into a time series of the log document;

determining whether there is the situation annotation in the log document; and displaying a log segment corresponding to the timestamps of the exception event and the error situation in the situation annotation when a determining result is yes.

2. The non-transitory computer-readable record medium according to claim 1, wherein the electronic apparatus comprises a touchscreen display to display the enabling button and the annotation button.

3. An electronic apparatus, configured to execute a logging method stored on a non-transitory computer-readable record medium, wherein the executing comprises the following steps:

recording a log into a log document by using an enabling button;

determining an occurrence of an exception event and an error situation;

executing a situation annotation by using an annotation button based on situation determining, wherein the situation annotation comprises timestamps of the exception event and the error situation, and the situation determining is an occurrence of error determining or exception determining;

storing the situation annotation into a time series of the log document;

determining whether there is the situation annotation in the log document; and displaying a log segment corresponding to the timestamps of the exception event and the error situation in the situation annotation when a determining result is yes.

4. The electronic apparatus according to claim 3, wherein the electronic apparatus comprises a touchscreen display to display the enabling button and the annotation button.

5. A logging method suitable for and executed by an electronic apparatus, wherein the logging method comprises the following steps:

recording a log into a log document by using an enabling button;

determining an occurrence of an exception event and an error situation;

executing a situation annotation by using an annotation button based on situation determining, wherein the situation annotation comprises timestamps of the exception event and the error situation, and the situation determining is an occurrence of error determining or exception determining;

storing the situation annotation into a time series of the log document;

determining whether there is the situation annotation in the log document; and displaying a log segment corresponding to the timestamps of the exception event and the error situation in the situation annotation when a determining result is yes.

6. The logging method according to claim 5, wherein the electronic apparatus comprises a touchscreen display to display the enabling button and the annotation button.

\* \* \* \* \*